United States Patent [19]

Jarnuszkiewicz

[11] 4,020,801

[45] May 3, 1977

[54] TWO-STROKE, MULTICYLINDER, SPARK IGNITION, PUMPLESS INJECTION INTERNAL COMBUSTION ENGINE

[75] Inventor: Stanislaw Jarnuszkiewicz, Krakow, Poland

[73] Assignee: Politechnika Karkowska, Krakow, Poland

[22] Filed: Nov. 7, 1974

[21] Appl. No.: 521,896

[30] Foreign Application Priority Data

Nov. 9, 1973 Poland .............................. 166446

[52] U.S. Cl. .......................... 123/32 SP; 123/59 B; 123/59 EC; 123/65 E

[51] Int. Cl.[2] .......................................... F02C 75/20

[58] Field of Search ............. 123/1 R, 59 EC, 65 E, 123/32 AE, 122 E, 32 SP, 6 JR, 59 B, 59 BM

[56] References Cited

UNITED STATES PATENTS

| | | | |
|---|---|---|---|
| 910,220 | 1/1909 | Nichols | 123/32 SP |
| 1,312,387 | 8/1919 | Connolly | 123/59 EC |
| 1,354,786 | 10/1920 | Tartrais | 123/32 SP |
| 1,559,216 | 10/1925 | Woolson | 123/122 E |
| 2,033,575 | 3/1936 | Hochretter et al. | 123/122 E |
| 2,440,645 | 4/1948 | Pyk et al. | 123/65 |
| 2,587,339 | 2/1952 | Du Rostu | 123/32 SP |
| 2,986,130 | 5/1961 | McMillan | 123/59 B |
| 3,450,353 | 6/1969 | Eckert | 123/32 AE |
| 3,592,392 | 7/1971 | Huber | 123/32 AE |

FOREIGN PATENTS OR APPLICATIONS

| | | | |
|---|---|---|---|
| 226,495 | 7/1909 | Germany | 123/59 EC |
| 344,072 | 2/1920 | Germany | 123/59 EC |
| 463,031 | 4/1951 | Italy | 123/59 B |

*Primary Examiner*—C. J. Husar
*Assistant Examiner*—Paul Devinsky

[57] ABSTRACT

This invention relates to a two-stroke, spark ignition, internal combustion engine, with two, three, four or six cylinders. Fuel injection is provided by means of combustion gases and no fuel pump is employed. The working spaces of the engine cylinders are interconnected by means of ducts in such a manner that during the working stroke a small amount of high pressure combustion gases enters the working space, after the duct port is uncovered by the piston carrying over on their way a predetermined amount of fuel, thereby effecting the injection.

1 Claim, 8 Drawing Figures

TWO-STROKE, MULTICYLINDER, SPARK IGNITION, PUMPLESS INJECTION INTERNAL COMBUSTION ENGINE

BACKGROUND OF THE INVENTION

This invention relates to a two-stroke, spark ignition, internal combustion engine, with two, three, four or six cylinders. Fuel injection is provided by means of combustion gases and no fuel pump is employed. In this engine the working spaces of cylinders are interconnected by means of ducts in such a manner that during the working stroke a small amount of high pressure combustion gases enters the working space, after the duct port is uncovered by the piston, carrying along a predetermined amount of fuel, thereby effecting the injection.

The engine according to this invention operates as follows fuel injection is accomplished, with the absence of any fuel pump, in a three-cylinder two-stroke engine in which the cranks are spaced 120° apart. The working space of each cylinder is connected by two small bore ducts with the other cylinders and each of these ducts has the inlet in the cylinder wall of one cylinder above the piston midstroke and the injection outlet in the cylinder wall of the other cylinder below the midstroke. To accomplish pumpless fuel injection in a four-cylinder two-stroke internal combustion engine, the cylinders are arranged in series or in the form of a V, in such a manner that the working spaces of cylinders, in which ignition occurs every 180° of crankshaft revolution, are interconnected by gas ducts to which the fuel is delivered at a controlled rate so that the exhaust gases of one cylinder carry the fuel and accomplish the injection in the other cylinder in which the ignition takes place after an additional crankshaft revolution of 180°. The exhaust gases from this second cylinder inject the fuel in the first cylinder after an additional crankshaft revolution of 180°.

This invention accomplishes pumpless injection of fuel in a six-cylinder, two-stroke engine with the cylinders arranged in series or in the form of a V in such a manner that the working spaces of cylinders are interconnected by gas ducts to which the fuel is delivered at a predetermined rate; each pair of cylinders in which ignition occurs every 180° of crankshaft revolution is interconnected, or each three cylinders in which the ignition occurs every 120° are interconnected by means of ducts. Each of the said ducts has the inlet in the cylinder wall of one cylinder above the piston midstroke and the injection outlet in the other cylinder below the piston midstroke.

A common characteristic trait of all systems and the fact that the axes of injection ports are directed towards the inlets of precombustion chambers, and that the spark plug is located in the precombustion chamber within the conical surface determined by the injection stream, as well as at the spot where fuel is introduced into the gas passages; open fuel meters are provided which consist of a metering chamber with a capacity greater than the maximum charge of fuel per one working cycle and inlet and outlet passages of a diameter less than ½ of the gas duct bore. At the place where fuel meter is located; a solenoid-operated fuel valve can be also installed. Apart from this, a further common characteristic trait is that the fuel supply ducts to the meters are preheated by means of combustion gases and that the gas duct inlet ports widen with an off-set in the proximity of the cylinder bearing surface.

The hitherto known solutions of two-cylinder internal combustion engines with pump-less injection of fuel, in which the working spaces are interconnected by gas ducts, do not provide for any system of three- and more cylinder engines and do not specify the direction of the injection stream, location of spark plug and fuel meters.

SUMMARY OF THE INVENTION

In the internal combustion engine according to this invention a pump-less injection of fuel into three-, four- and six-cylinder engines and open fuel meters has been employed, thereby eliminating automatic valves that are unreliable in operation. The injection of fuel into the interior of precombustion chamber within the spark plug has been employed with simultaneous preheating of the fuel duct with combustion gases, using widened inlet ports on the gas ducts in the vicinity of the cylinder bearing surface in order to eliminate the collection of carbon deposits at the port outlets. The above described improvements permit the use of economical and simple injection systems in all two-stroke, multicylinder, internal combustion engines, with very low consumption of fuel, possibility of using heavy fuels and decrease in the toxicity of combustion gases being obtained.

BRIEF DESCRIPTION OF THE DRAWING

The internal combustion engine according to this invention is illustrated by drawings.

DESCRIPTION OF PREFERRED EMBODIMENTS

Figure 1:
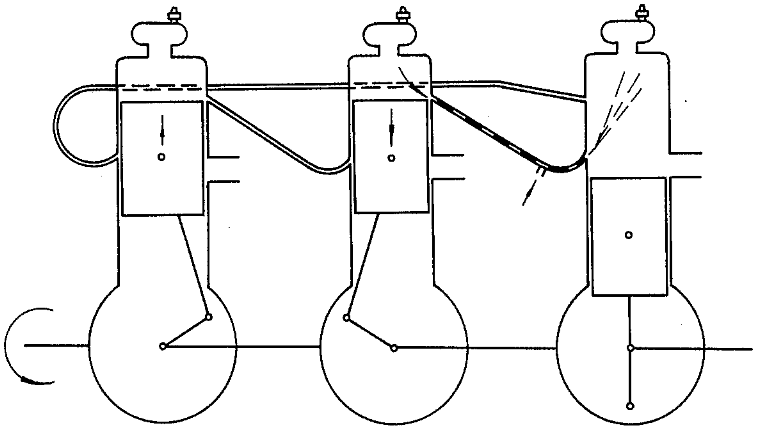
FIG. 1, FIG. 2 and FIG. 3 represent diagrammatically a three-cylinder engine, and show fuel injection into individual cylinders.
Figure 2:
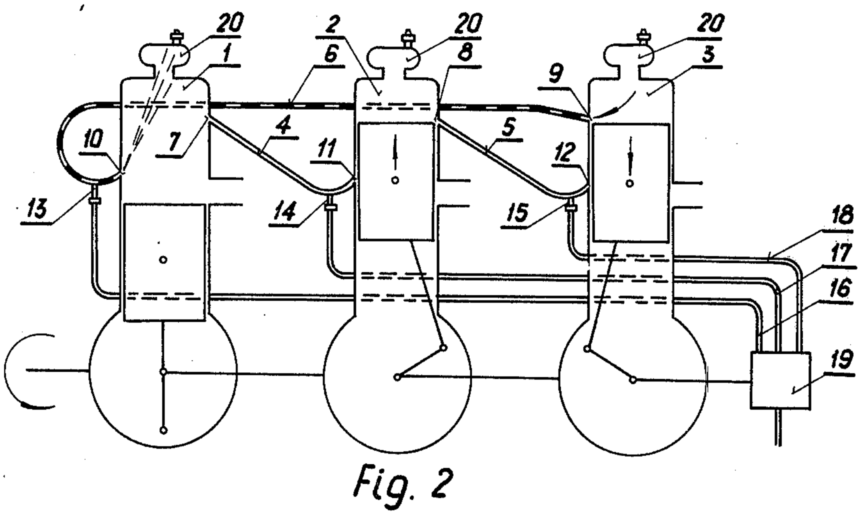
Figure 3:
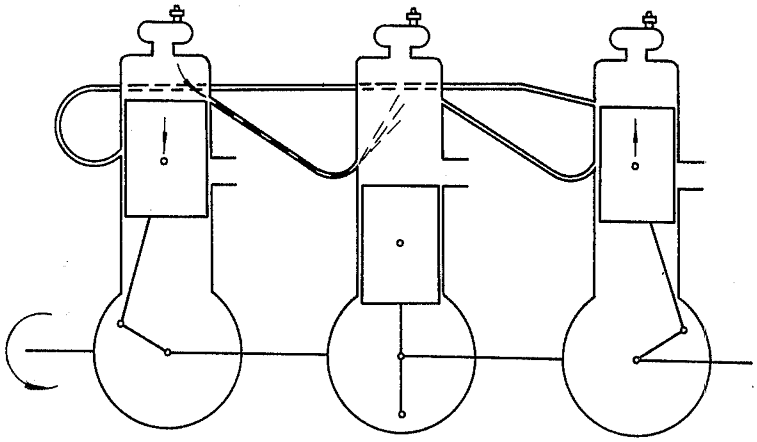

The principle of a three-cylinder internal combustion engine operation according to the present invention is as follows:

FIG. 1 shows diagrammatically an engine at the moment the piston uncovered the inlet port 8 of the gas duct 5 in the cylinder 2 after the ignition. At this moment a certain amount of combustion gases passes at a high velocity and high pressure into the space of the cylinder 3 carrying along and atomizing on their way the fuel supplied to the metering valve 15 by a variable-delivery pump 19. This fuel is injected into the precombustion chamber 22. FIG. 2 represents the same engine after the rotation of the crankshaft by 120 deg., the combustion gases being taken from the cylinder 3 and injected into the cylinder 1. In FIG. 3 fuel is injected into the cylinder 2 and combustion gases are taken from the cylinder 1.

The injection into individual cylinders takes place as soon as the piston comes near the bottom dead centre, which is advantageous owing to the long period of time during which mixture is generated in the cylinder, i.e., almost during the entire compression stroke. The injection moment is determined by the position of inlet ports /7,8,9/ of ducts /4,5,6/ in relation to the top dead centre of the piston, which ports must be present in the cylinder wall above the piston midstroke. On the other hand, because of a pressure difference required for effecting the injection, the injection ports /10,11,12/ must be located in the cylinder wall below the piston midstroke.

Figure 4:
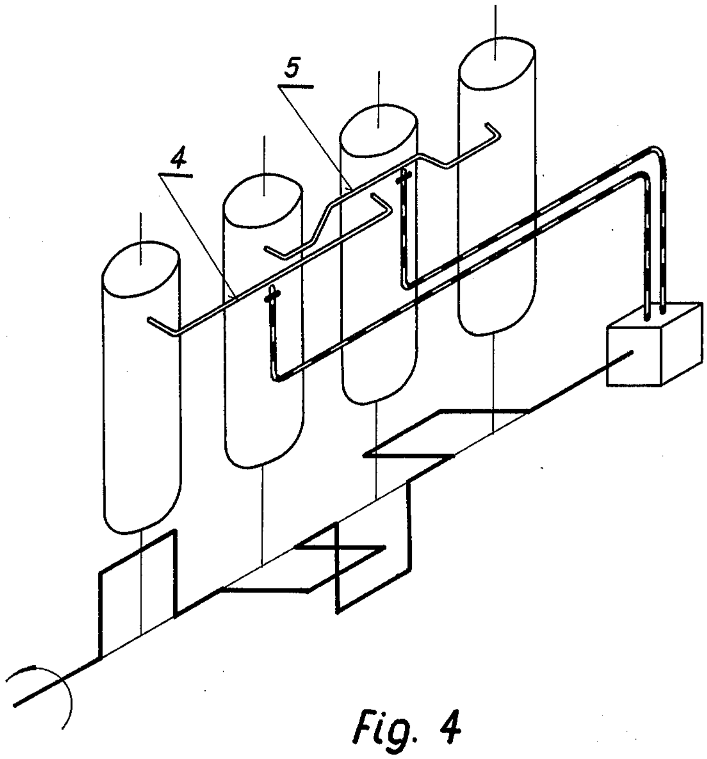
FIG. 4 shows diagrammatically a duct system in a four-cylinder engine.
Figure 6:
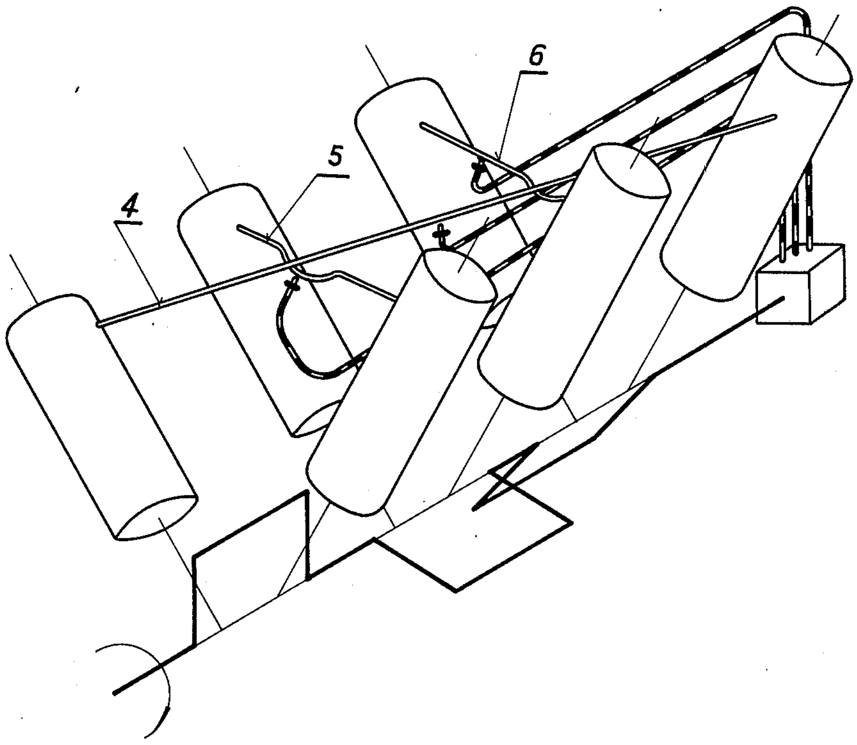

The principle of operation of a two-stroke, four-cylinder, pump-less injection engine according to this invention is shown in FIG. 4 which is restricted to the representation of a diagram of interconnection between individual cylinders by gas ducts. Only such pairs of cylinders are interconnected for which the crankshaft crank arms are spaced 180 deg. apart on the drawing of cylinders 1 and 3, and 2 and 4. In this way two systems such as shown for a two-cylinder engine. FIG. 6, are obtained, the cylinders being connected two by two by means of a single duct 4 and 5, and the inlet and outlet ports of this duct being located in the cylinder wall above the piston midstroke at the same distance from the piston top dead centres.

Figure 5:
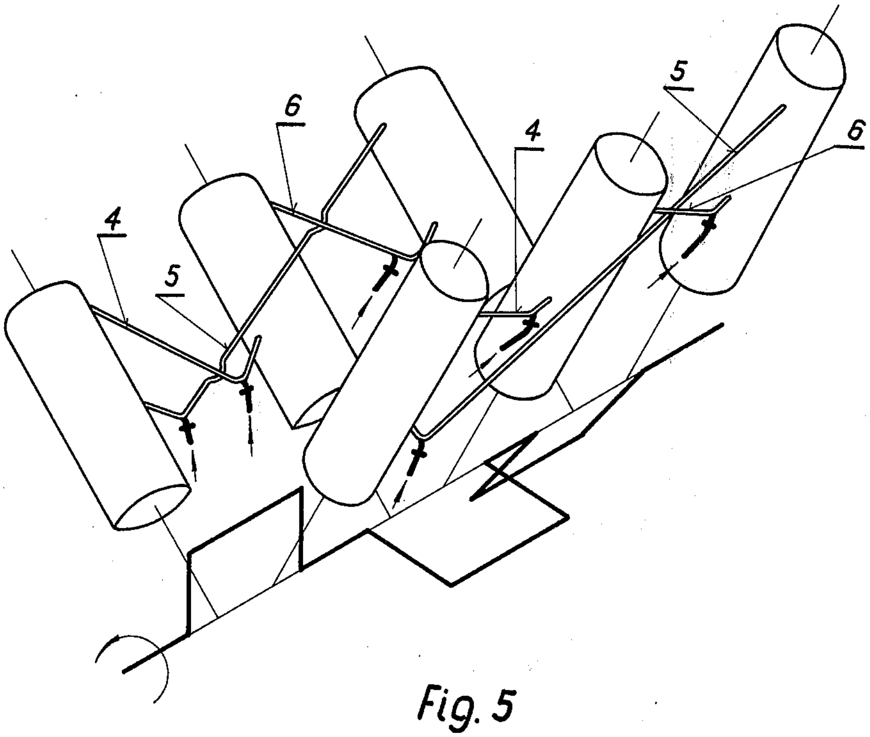
FIG. 5 and FIG. 6 in a six-cylinder engine.

The principle of operation of a six-cylinder engine according to the present invention is shown diagrammatically in FIG. 6. This figure also is restricted to the representation of a diagram of connections between individual cylinders by means of gas ducts. The principle of interconnection is such that three pairs of cylinders are interconnected /FIG. 5/ for which the crankshaft crank arms are spaced 180° apart. In this case two cylinders are connected by a single gas duct 4, 5, and 6, located as in a two-cylinder engine above the piston midstroke and at the same distance from piston top dead centres. The other principle of cylinders interconnection, FIG. 6, is such that each three cylinders are interconnected for which the crankshaft crank arms are spaced 120 deg. apart, as was done in the case of three-cylinder engine /FIG. 1, 2 and 3/, each of said three cylinders being connected with two remaining ones by means of two gas ducts 4, 5 and 6.

Figure 7:
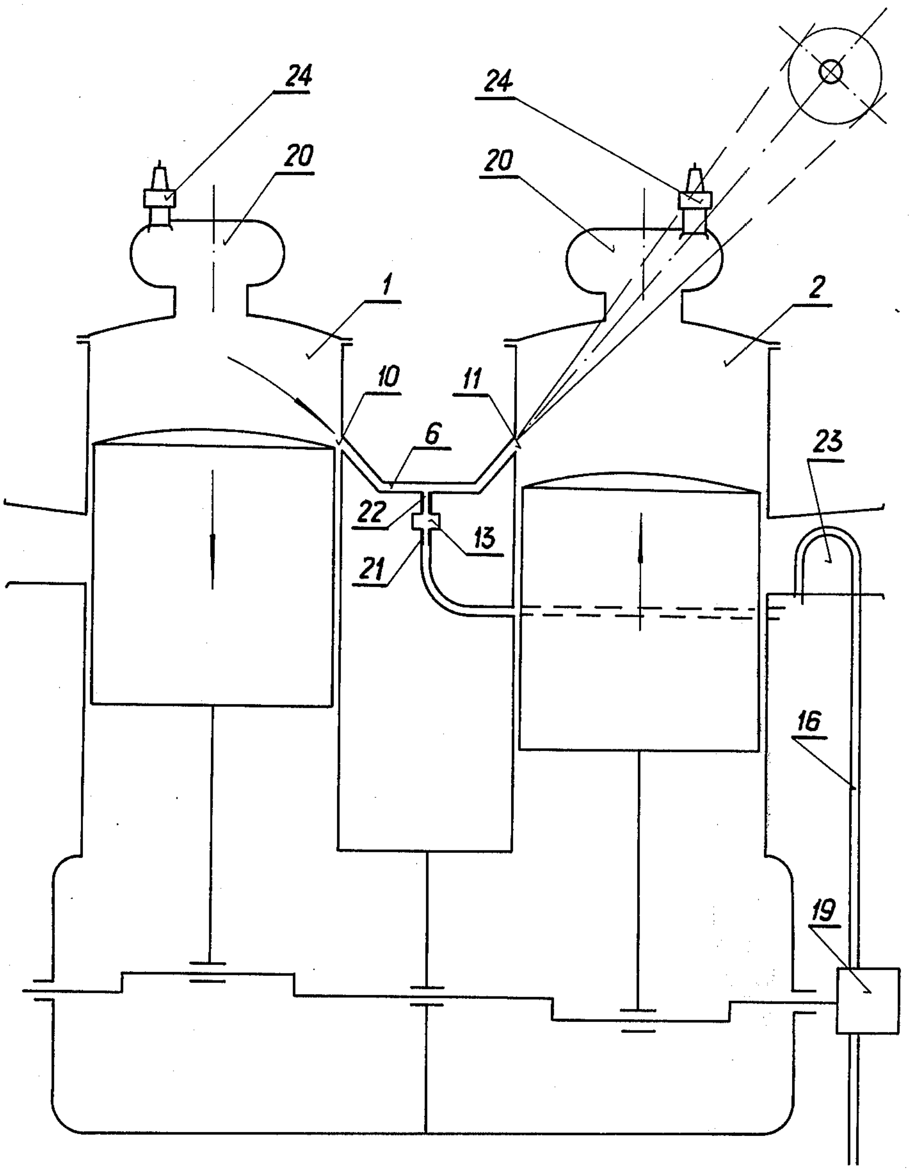
FIG. 7 shows diagrammatically a two cylinders two-stroke engine, the direction of injection into the precombustion chambers, location of spark plugs, fuel metering valve and fuel heater being indicated.

FIG. 7 shows the supply system according to the present invention on an example of a two-stroke, two-cylinder engine in which the crankshaft cranks are spaced 180 deg. apart. The fuel is supplied at a controlled rate by the pump 19 to the duct 16. A certain length of the duct 16 passes through the engine exhaust manifold, thereby forming a fuel preheater. The temperature to which the fuel is preheated is almost independent of the engine load, since the change in the combustion gases temperature is approximately inversely proportional to the number of engine revolutions, i.e., to the heating time of a given fuel charge. The preheated fuel is delivered to the fuel metering valve 13. The fuel metering valve 13 is of an open type and has no automatic check valves. It consists of an inlet passage 21, and outlet passage 22 and a metering chamber. The bores of the passages 21 and 22 are smaller than half of the bore of gas duct 6 joining the cylinder together. The cubic capacity of the meter chamber is somewhat greater that the maximum fuel charge per operating cycle of one cylinder.

As soon as the piston uncovers the inlet 10 of the gas duct 6 in the cylinder 1 during the operation cycle, a flow of a certain small amount of combustion gases occurs in the duct 6, the fuel being carried along from the metering valve 13 and atomized, and a charge of fuel contained therein being injected into the cylinder 2. After the rotation of the crankshaft by 180° the combustion gases flow through the duct 6 from the cylinder 2 into the cylinder 1 and the injection of fuel supplied meantime to the metering valve takes place at the same time.

The bore of the gas duct 6 at the narrowest place is smaller than 0.04 of the cylinder bore. The ports of the gas duct through the medium of which the fuel is injected /ports 10 and 11 in a two-cylinder engine and ports 13 and 14 in a three-cylinder engine/,located in the cylinder wall are directed in such a way that the injection stream strikes the inlet of the precombustion chamber 31 and 32. The spark plug 34 is located in the precombustion chamber within the conical surface formed by the injection stream FIG. 7.

Instead of fuel metering valve 13, 14 and 15 in the engine according to the present invention, solenoid-operated valves can be used, the opening time of which being controlled electronically.

Figure 8:
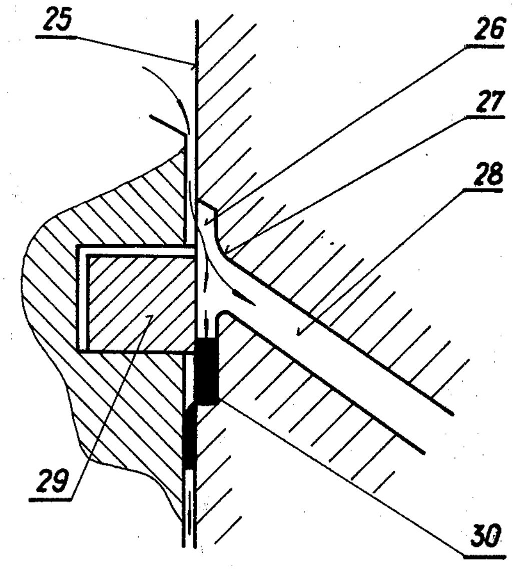
FIG. 8 represents the sign of the gas duct inlet opening.
Figure 8:
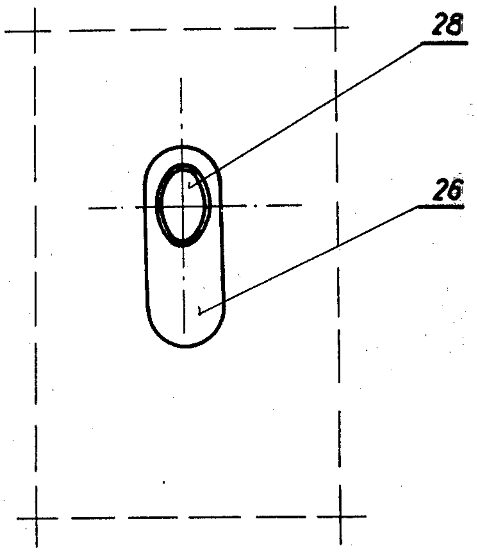

FIG. 8 shows the design of gas duct inlet port /ports 10 and 11 in the two-cylinder engine and ports 7, 8 and 9 in the three-cylinder engine/. The injection port in the proximity of the cylinder bearing surface 25 is enlarged by a set-off forming the space 26, the edges 27 of the inlet port 28 being rounded off.

The function of the space 26 is to collect the oil scraped by the piston rings during the movement of the piston and during the working stroke; the instant the space 26 is uncovered by the upper piston ring 29, the oil 30 contained therein is blown between the piston and cylinder bearing surface.

As a result, no carbon deposits from the carbonized oil are collected in the tip of the gas duct port. The rounded off edges of the port eliminate whirling of the gas stream.

What we claim is:

1. A two-stroke, spark ignition, internal combustion engine with fuel injection by means of combustion gases having a crank-shaft with cranks spaced at 120° intervals comprising: ignition means of 1-3-2 sequence, means for supplying fuel at a predetermined rate, means for delivering fuel with three gas ducts, three cylinders each having two ports in the cylinder wall, said ports being an upper inlet port between the piston midstroke and the piston top dead center and a lower outlet port below the piston midstroke and the bottom dead center, in said engine the upper port of the first cylinder communicating through said gas duct with the lower port of the second cylinder, and the lower port of the first cylinder communicating through said gas ducts with the upper port of a third cylinder, the upper port of the second cylinder communicating through said gas ducts with the lower port of the third cylinder, said means for delivering fuel being connected to each of said gas ducts so that combustion gases in the cylinder flow through the gas duct to the cylinder in which the piston is near the bottom dead center and entrain fuel being delivered to this respective duct by said fuel delivering means, said flow being completed when the lower outlet port is covered by the piston, the injection having occurred in the cylinder after opening of the upper inlet port by the piston, the upper port of the first cylinder communicating through the gas duct with the lower port of the third cylinder and the lower port of the first cylinder communicates through the gas duct with the upper port of the second cylinder, and the lower port of the second cylinder communicates through the gas duct with the upper port of the third cylinder, said means for delivering fuel being connected to each of said gas ducts, said gas ducts communicating in said sequence with working spaces of said cylinders, the fuel being delivered at a predeterminated rate, three fuel proportioners having open valveless means, a metering space of cubic capacity greater than the maximum dose of fuel per one working cycle, a necked-down inlet passage and a necked-down outlet passage, each proportioner communicating by the outlet passage with one gas duct and by the inlet passage with means for delivering fuel at a predetermined rate, fuel through the inlet passage flowing into the metering space, the combustion gases passing the gas duct to the metering space through the outlet passage for displacing the fuel dose enclosed in it and extruding said dose through the same outlet passage to the gas duct, precombustion chambers, in said engine said lower outlet ports of gas ducts in cylinder walls being directed towards the inlet of precombustion chambers, the injection stream injected from said ports forming a substantially rich mixture in the precombustion chamber, an exhaust manifold, in said engine said gas ducts communicating with said cylinders being on a predetermined part of its length in said exhaust manifold, said ducts being preheated by combustion gases, said upper inlet ports in cylinders walls being located higher than the height of piston seal rings, oil collecting on edges of said ports lubricating the cylinder at the instant when the port is uncovered by the piston ring and is forced by gas pressure above the ring between the cylinders bearing surface and the piston.

* * * * *